(12) United States Patent
Carlstedt et al.

(10) Patent No.: US 6,659,482 B2
(45) Date of Patent: Dec. 9, 2003

(54) COMPOSITE SPRING AND CONTROL ARM

(75) Inventors: Robert P. Carlstedt, Rochester Hills, MI (US); Mark C. Smith, Troy, MI (US); Steven M. Foster, Rochester, MI (US); Daniel Eugene Whitney, Arlington, MA (US); Eric Stephen Geib, Fenton, MI (US); Richard M. Clisch, Canton, MI (US); Shan Shih, Troy, MI (US); Juan J. Marcos Munoz, Navara (ES)

(73) Assignee: Meritor Light Vehicle Technology, LLC, Troy, MI (US)

( * ) Notice: Subject to any disclaimer, the term of this patent is extended or adjusted under 35 U.S.C. 154(b) by 8 days.

(21) Appl. No.: 10/038,226

(22) Filed: Jan. 3, 2002

(65) Prior Publication Data

US 2003/0122338 A1 Jul. 3, 2003

(51) Int. Cl.⁷ ................................................ B60G 3/28
(52) U.S. Cl. ........................ 280/124.14; 280/124.171; 267/36.1
(58) Field of Search .................... 280/124.14, 124.171; 267/36.1, 40, 47

(56) References Cited

U.S. PATENT DOCUMENTS

| | | | |
|---|---|---|---|
| 2,038,597 A | | 4/1936 | Peo |
| 2,206,101 A | * | 7/1940 | Metz .................... 280/124.126 |
| 2,458,548 A | * | 1/1949 | Aronson ...................... 267/42 |
| 2,471,135 A | * | 5/1949 | Wyeth ........................ 267/192 |
| 3,190,632 A | * | 6/1965 | Barenyi ...................... 267/158 |
| 3,710,882 A | * | 1/1973 | Marceau .................... 180/9.38 |
| 4,313,618 A | | 2/1982 | Robinson |
| 4,422,666 A | * | 12/1983 | Proctor ................... 280/86.757 |
| 4,458,918 A | * | 7/1984 | Rumpel ............... 280/124.143 |
| 4,509,774 A | | 4/1985 | Booher |
| 4,540,197 A | * | 9/1985 | Finn et al. ................ 280/6.157 |
| 4,614,359 A | | 9/1986 | Lundin et al. |
| 4,753,456 A | | 6/1988 | Booher |
| 4,767,134 A | | 8/1988 | Booher |
| 4,768,807 A | | 9/1988 | McGibbon et al. |
| 4,779,894 A | | 10/1988 | Cowburn |
| 4,813,704 A | * | 3/1989 | Smith .................. 280/124.109 |
| 4,854,606 A | * | 8/1989 | de Goncourt et al. .. 280/124.14 |
| 4,861,067 A | | 8/1989 | Booher |
| 4,887,841 A | | 12/1989 | Cowburn et al. |
| 4,893,832 A | | 1/1990 | Booher |
| 4,903,984 A | | 2/1990 | Kajiwara et al. |
| 4,997,202 A | * | 3/1991 | Kitagawa et al. ...... 280/124.14 |
| 5,016,861 A | * | 5/1991 | Thompson et al. ........... 267/44 |
| 5,058,918 A | * | 10/1991 | Nakaya et al. ........ 280/124.136 |
| 5,137,300 A | * | 8/1992 | Walton .................... 280/5.503 |
| 5,219,176 A | * | 6/1993 | Mitchell ................ 280/93.512 |
| 5,251,930 A | * | 10/1993 | Kusaka et al. ......... 280/124.14 |
| 5,382,034 A | | 1/1995 | Parker et al. |
| 5,398,411 A | | 3/1995 | Kusada et al. |
| 5,415,426 A | * | 5/1995 | Strasser ............... 280/124.136 |
| 5,826,896 A | * | 10/1998 | Baumann ............. 280/124.171 |
| 6,029,987 A | * | 2/2000 | Hoffman et al. ...... 280/124.171 |
| 6,189,904 B1 | * | 2/2001 | Gentry et al. ......... 280/124.175 |
| 6,390,486 B1 | * | 5/2002 | Boes et al. ........... 280/124.171 |
| 6,406,007 B1 | * | 6/2002 | Wilson ....................... 267/36.1 |
| 2002/0000703 A1 | * | 1/2002 | Lawson et al. .......... 280/124.1 |

* cited by examiner

Primary Examiner—Paul N. Dickson
Assistant Examiner—George D. Spisich
(74) Attorney, Agent, or Firm—Carlson, Gaskey & Olds

(57) ABSTRACT

A steering assembly is provided for a vehicle including an upper connection, typically provided by an upper control arm. A knuckle includes an upper and lower portions with the upper portion supported by the upper connection. A lower assembly of the present invention includes a control arm with legs extending from a spring portion at spaced apart ends. The legs extend from its ends and converge to a lower connection for supporting the lower portion of the knuckle with the upper and lower connections defining a wheel camber and a wheel caster. Preferably, each of the legs of the control arm has a different spring rate to provide a change in wheel camber under the deflection of the control arm during wheel travel. The different spring rates of the legs permits the lower connection to twist thereby enabling the wheel caster to change slightly during the upward and downward motion of the wheel.

9 Claims, 2 Drawing Sheets

COMPOSITE SPRING AND CONTROL ARM

BACKGROUND OF THE INVENTION

This invention relates to a control arm and spring arrangement for a suspension assembly, and more particularly, the invention relates to a control arm and spring arrangement that permits a change in caster and camber during wheel travel.

There are numerous types of suspension configurations commonly used in modern vehicles. One type of suspension configuration includes an upper and lower control arm supporting a knuckle there between. The control arms are typically rigid members stamped from steel or cast from another metal. A spring and shock absorber is typically connected to a portion of the lower control arm and a frame portion to provide a particular spring rate and control the movement of the wheel supported on the knuckle. The geometry of the upper and lower control arms, in part, control such parameters as wheel camber, wheel caster and steering angle.

For particular vehicle applications, it may be problematic to package the shock towers, coil springs, struts, connecting rods, and other suspension related hardware. To this end, suspension assemblies have been developed which incorporate a composite spring-like device with a lower suspension member. The lower suspension member supports a portion of the knuckle and is connected to an intermediate spring portion, which provides at least partially, the spring rate for the suspension assembly. However, the composite spring and suspension members of the prior art are rather simple, and are unable to provide the ability to change suspension parameters such as wheel caster. Therefore, what is needed is a suspension assembly having a composite spring and suspension member that provides a change in wheel caster during wheel travel.

SUMMARY OF THE INVENTION AND ADVANTAGES

The present invention provides a steering assembly for a vehicle including an upper connection, typically provided by an upper control arm. A knuckle includes an upper and lower portions with the upper portion supported by the upper connection. A lower assembly of the present invention includes a control arm with legs extending from a spring portion at spaced apart ends. The legs extend from its ends and converge to a lower connection for supporting the lower portion of the knuckle with the upper and lower connections defining a wheel camber and a wheel caster. Preferably, each of the legs of the control arm has a different spring rate to provide a change in wheel camber under the deflection of the control arm during wheel travel. The different spring rates of the legs permits the lower connection to twist thereby enabling the wheel caster to change slightly during the upward and downward motion of the wheel.

Accordingly, the above invention provides a suspension assembly having a composite spring and suspension member that provides a change in wheel caster during wheel travel.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
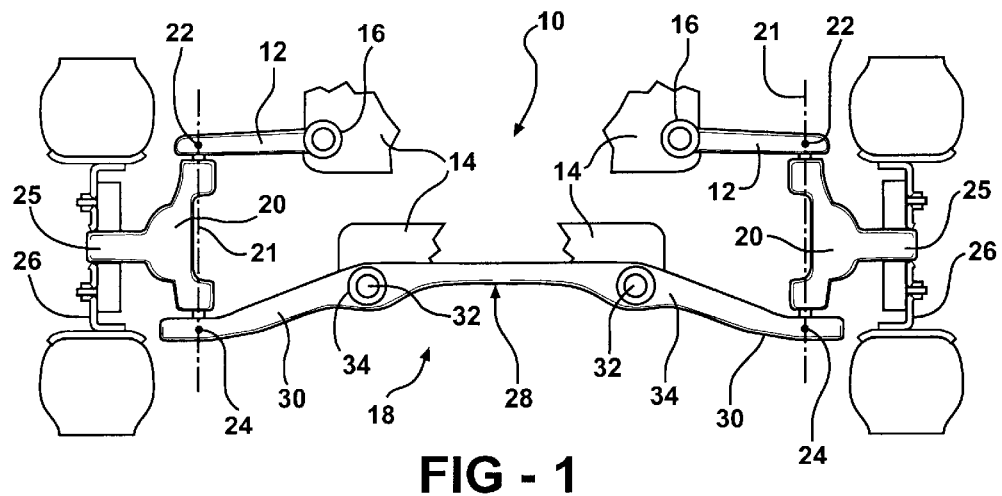
FIG. 1 is a front elevational view of the present invention suspension assembly.

A suspension assembly 10 is shown in FIG. 1. The suspension assembly 10 includes an upper control arm 12 supported by a frame 14 and rotatable relative thereto about pivotal axis 16. A lower assembly 18 is also supported by the frame 14 beneath the upper control arms 12. A knuckle 20 is arranged between the upper control arm 12 and lower assembly 18 and is connected respectively to an upper connection 22 and a lower connection 24 provided by the upper control arm 12 and lower assembly 18. The upper 22 and lower 24 connections define a steer axis 21 about which the knuckle 20 rotates in response to steering inputs. A spindle 25 extending from the knuckle 20 supports wheel 26.

The lower assembly 18 of the present invention obviates, or at least greatly reduces, the need for suspension components such as shock towers or coil springs. Additionally, the lower assembly 18 of the present invention simplifies packaging of the suspension assembly 10 within the vehicle since fewer suspension components need be packaged between the frame and knuckle. To this end, lower assembly 18 includes an intermediate spring portion 28 integrally formed with opposing lower control arms 30. The lower control arms 30 are rotatable about pivotal axis 32 as the wheels 26 move upward and downward in response to inputs from the roadway.

Figure 2:
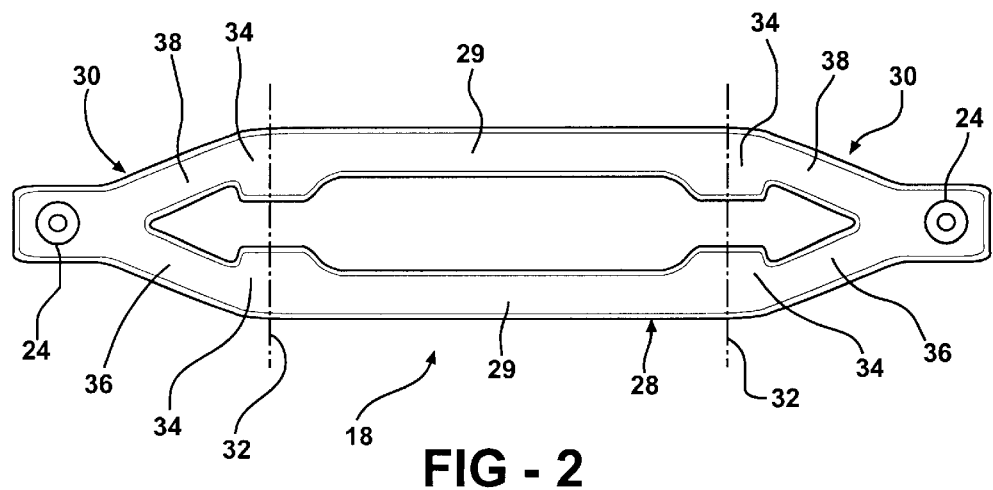
FIG. 2 is a top elevational view of the lower suspension assembly of the present invention.

As best seen in FIG. 2, the intermediate spring portion 28 includes lateral members 29 spaced apart from, and preferably, parallel to one another. The lower control arm 30 includes first 36 and second 38 legs extending from the intermediate spring portion 28 at ends 34 of the legs 36 and 38, which are adjacent to the pivotal axis 32. The legs 36 and 38 converge to provide the lower connection 24 for supporting the knuckle 20.

The lower assembly 18 is constructed from a material capable of deflections such as a reinforced polymer. For example, as the lower control arm 30 moves upward in response to an input from the roadway, the lateral members 29 may bow downward and provide a spring force similar to that typically provided by coil springs. Additionally, the control arms may also deflect in response to inputs for the roadway to further effect spring rate provided by the lower assembly 18.

The lower assembly 18 provides a suspension structure that enables the camber and caster to change in a desirable, controlled manner during upward and downward wheel travel. It is known in the prior art to provide rigid suspension geometries that permit the camber to change in response to inputs from the roadway and during banking maneuvers during vehicle turning. That is, it may be difficult and undesirable in certain instances to utilize suspension geometries having rigid control arms and conventional suspension components to provide changes in wheel camber. To this end, the lower assembly 18 of the present invention permits a change in wheel camber as the lower control arm 30 and intermediate spring portion 28 deflect in response to inputs received from the roadway.

Figure 3:
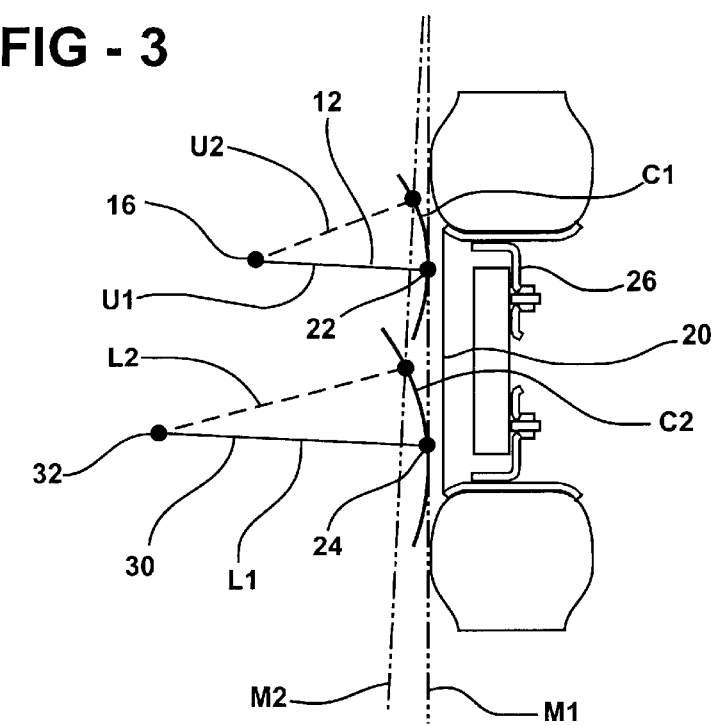
FIG. 3 is a schematic view of the change in camber permitted by the present invention suspension assembly.

Referring to FIG. 3, the knuckle 20 is shown supported by upper 22 and lower 24 connections to carry wheel 26. The upper 12 and lower 30 control arms are shown in a first position U1 and L1, respectively. In this position, the upper 22 and lower 24 connections define a camber of M1. In response to an input from a roadway, the upper 22 and lower 24 connections move, respectively, along a path C1 and C2 such that upper 12 and lower 30 control arms rotate respectively about the pivotal axes 16 and 32 to a second position U2 and L2. As can be seen in the Figure, the lower control arm 30 deflects in response to the force transmitted by the wheel 26 from the roadway and, as a result, the lower connection 24 moves in a more acute arc C2 than if the lower control arm 30 did not deflect at all. In this manner, a camber of M2 may be achieved, which may permit a more desirable packaging of the suspension assembly 10.

Figure 4:
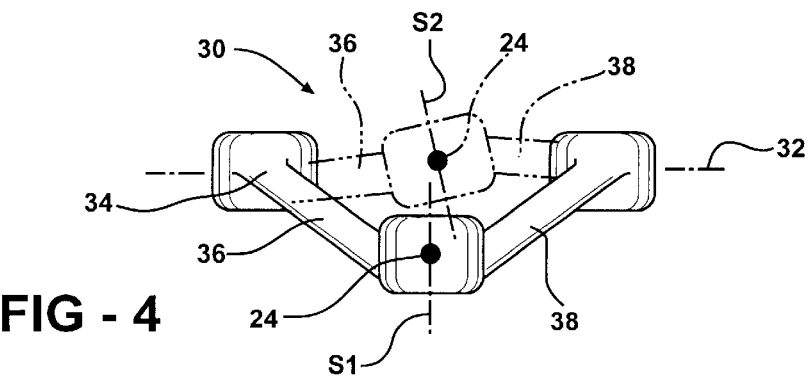
FIG. 4 is a side-elevational view of the lower control arm of the present invention.
Figure 5:
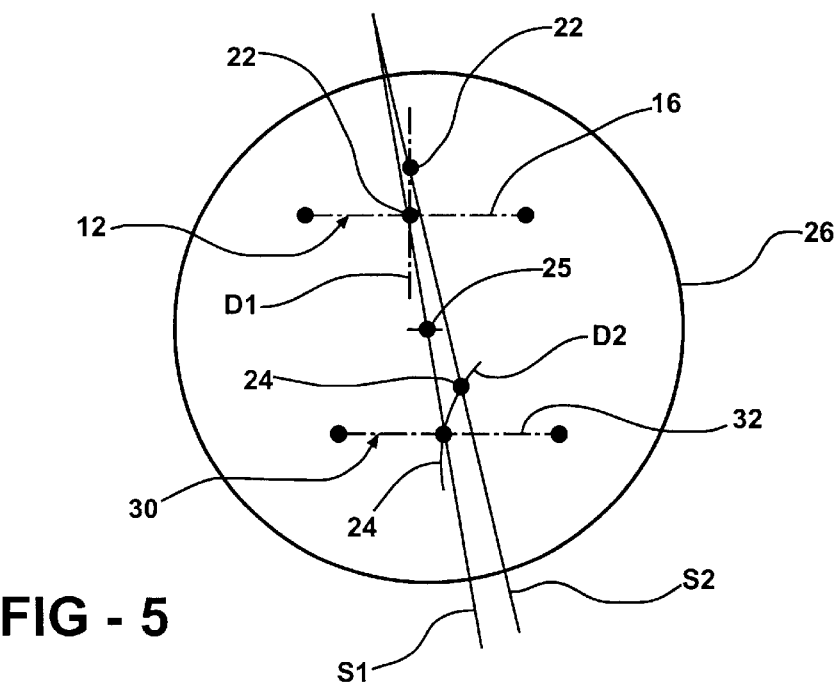
FIG. 5 is a schematic view of the change in caster of the present invention suspension assembly.

The lower assembly 18 of the present invention may also permit a change in wheel caster, as shown in FIGS. 4 and 5. The first 36 and second 38 legs may respectively have first and second spring rates that are different from one another. Similarly, the lateral members 29 may also have different spring rates to affect the deflection of the lower control arm 30, as will be appreciated from the discussion below. As shown in FIG. 4, the lower connection 24 may shift forward or rearward slightly and twist in response to an input from the roadway to permit a change in wheel caster from S1 to S2.

Referring now to FIG. 5, as the upper 12 and lower 30 control arms rotate about the pivotal axes 16 and 32, respectively, the upper 22 and lower 24 connections move along curves D1 and D2, respectively. For the suspension geometry shown, the upper connection 22 moves in a linear fashion along D1 while the lower connection 24 moves in a slightly arcuate fashion along curve D2. In this manner, the wheel caster is permitted to change from the position shown by S1 to the position shown by S2. However, if the lateral members 29 and the legs 36 and 38 all had the same spring rate, a change in wheel caster could not be achieved.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A suspension assembly for a vehicle comprising:
   an upper connection;
   a knuckle having upper and lower portions with said upper portion supported by said upper connection; and
   a lower assembly including a spring portion defining a control arm with legs respectively extending from spaced apart ends and converging to a lower connection supporting said lower portion of said knuckle with said upper and lower connections defining a wheel camber and a wheel caster, wherein one of said legs has a first spring rate and the other of said legs has a second spring rate different than said first spring rate, said first and second spring rates providing a change in said wheel caster under deflection of said control arm.

2. The assembly according to claim 1, further including an upper control arm with said upper connection provided by a portion of said upper control arm.

3. The assembly according to claim 1, wherein said spring portion includes spaced apart lateral members with one of said ends provided at a portion of one of said lateral members and the other of said ends provided at a portion of the other of said lateral members.

4. The assembly according to claim 1, wherein said legs have a spring rate providing a change in said wheel camber under deflection of said control arm.

5. A suspension assembly for a vehicle comprising:
   an intermediate spring portion;
   first and second opposing control arms extending from said intermediate spring portion, each of said control arms rotatable about a pivotal axis with a pair of legs extending from ends of said intermediate spring portion at said pivotal axis toward one another for providing a connection for a knuckle, wherein one of said legs has a first spring rate and the other of said legs has a second spring rate different than said first spring rate, said first and second spring rates providing a change in wheel caster under deflection of said control arm.

6. The assembly according to claim 5, wherein said spring portion includes spaced apart lateral members with one of said ends provided at a portion of one of said lateral members and the other of said ends provided at a portion of the other of said lateral members.

7. The assembly according to claim 5, wherein said legs have a spring rate providing a change in wheel camber under deflection of said control arm.

8. The assembly according to claim 5, wherein said connection twists m a direction transverse to said pivotal axis.

9. A method of changing wheel caster comprising the steps of:
   a) providing a control arm with first and second legs converging to a connection,
   b) deflecting the first leg at a first spring rate;
   c) deflecting the second leg at a second spring rate different than the first spring rate; and
   d) twisting the connection to provide the change in wheel caster.

* * * * *

UNITED STATES PATENT AND TRADEMARK OFFICE
CERTIFICATE OF CORRECTION

PATENT NO. : 6,659,482 B2
DATED : December 9, 2003
INVENTOR(S) : Carlstedt et al.

It is certified that error appears in the above-identified patent and that said Letters Patent is hereby corrected as shown below:

<u>Column 4,</u>
Line 42, "m" should be -- in --
Line 47, "," should be -- ; --

Signed and Sealed this

Twenty-third Day of March, 2004

JON W. DUDAS
*Acting Director of the United States Patent and Trademark Office*